June 7, 1949.  T. A. DOWD  2,472,197
STRADDLE-TYPE LOG HANDLING CART WITH HYDRAULIC LIFT
Filed Dec. 3, 1947  3 Sheets—Sheet 1

Thomas A. Dowd
INVENTOR.

June 7, 1949.　　　　T. A. DOWD　　　　2,472,197
STRADDLE-TYPE LOG HANDLING CART WITH HYDRAULIC LIFT
Filed Dec. 3, 1947　　　　　　　　　　　　3 Sheets-Sheet 2
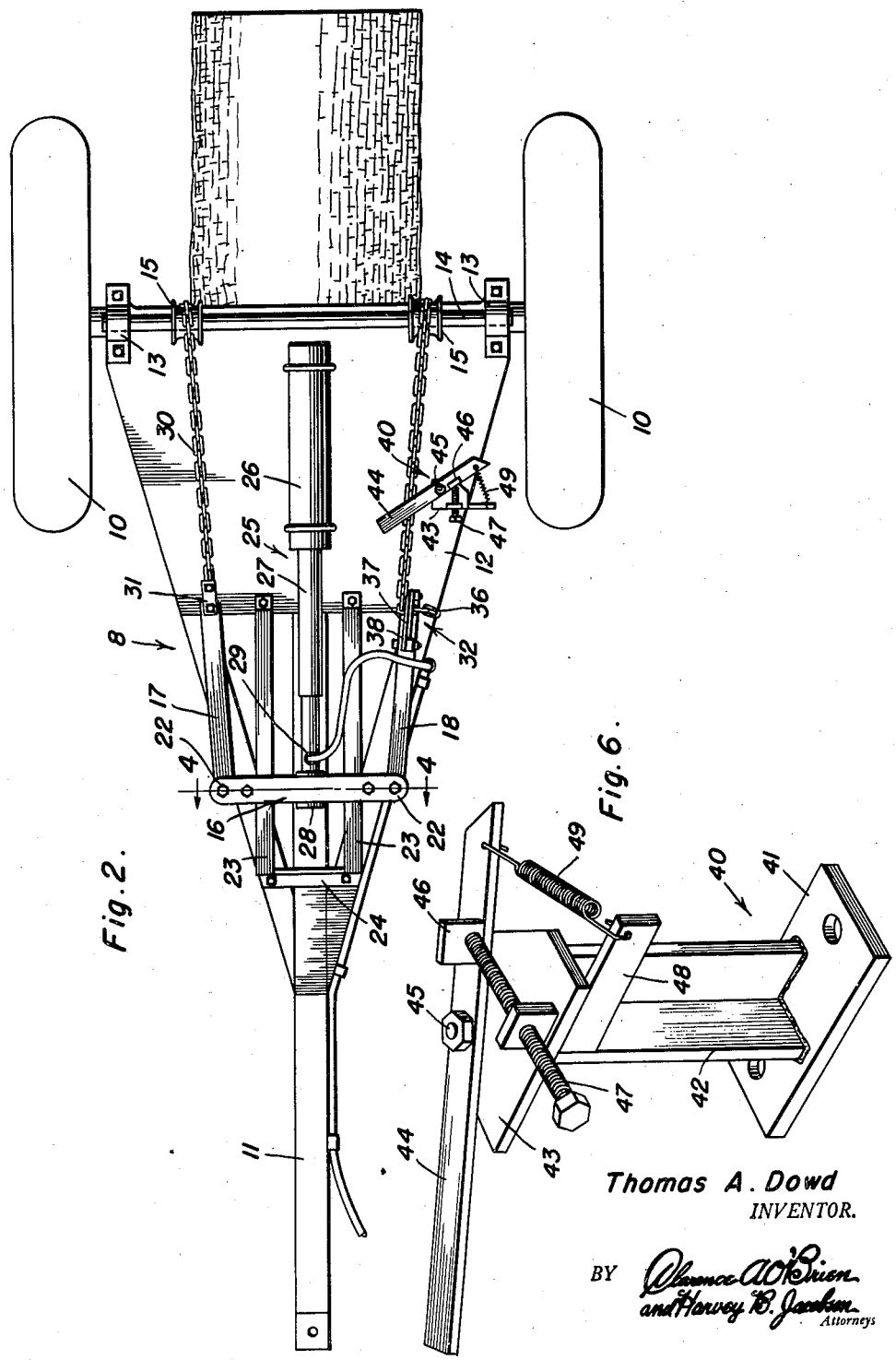
Thomas A. Dowd
INVENTOR.

June 7, 1949. T. A. DOWD 2,472,197
STRADDLE-TYPE LOG HANDLING CART WITH HYDRAULIC LIFT
Filed Dec. 3, 1947 3 Sheets-Sheet 3
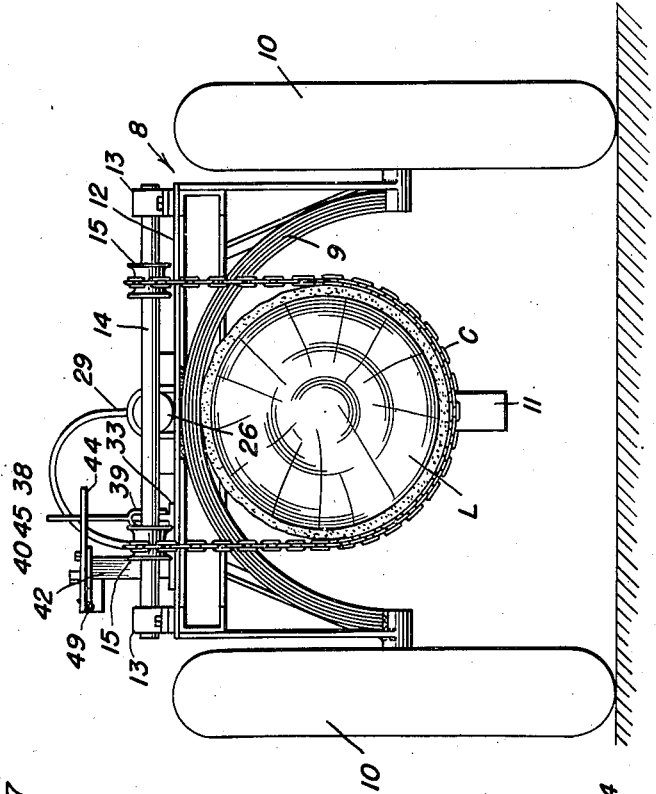
Thomas A. Dowd
INVENTOR.

Patented June 7, 1949

2,472,197

UNITED STATES PATENT OFFICE 2,472,197

STRADDLE-TYPE LOG HANDLING CART WITH HYDRAULIC LIFT

Thomas A. Dowd, Siler City, N. C.

Application December 3, 1947, Serial No. 789,409

9 Claims. (Cl. 214—65.3)

The present invention relates to certain new and useful improvements having to do with a straddle-type log and timber handling cart of the type in which the load is suspended beneath the cart between the wheels and is lifted, lowered and fixed by an embracing chain and an arched axle, in a well-known manner.

An object of the present invention is to structurally, functionally and otherwise improve upon log loading and carrying carts such as are now in use in the trade, one style of which is disclosed, for example, in Patent 2,361,181, granted to me under date of October 24, 1944.

More specifically, instead of employing the reeling and gearing arrangements and remote controls covered in said patent, I now provide a greatly and appreciably improved adaptation characterized by a hydraulic lift and practical means, whereby same is successfully utilized in actuating the chain.

Another object of the invention is to provide a highly practical and useful log and timber handling cart of the kind described which is further characterized by the utmost of simplicity in construction and arrangement of co-ordinating devices and parts and further novel in that it includes the stated power lift which makes for ease of operation, obviates the use of the customarily employed power take-off on a tractor and is susceptible of operation by unskilled hands.

A further object of the invention is to provide a power actuated load handling chain whose ends are connected with a horizontally disposed reciprocatory actuator unit, the latter operated by the hydraulic lift or jack, and the arrangement being such that the operator on a tractor, to which the cart is hitched, does not have to pull any ropes or get off of the tractor to unload the logs.

It is also an object to provide a structure of the aforementioned character which is such as to permit the operator on the tractor to maintain effective control over loading and balanced swing of the logs and otherwise attain resultful ends, all from the driver's seat.

More specifically, it is an object of the invention to provide a slidable jack-operated yoke, the latter slidably mounted on the cart, one chain end being securely fastened thereto and the other chain end releasably connected thereto by way of a readily releasable latch included hitch.

And a still further object of the invention is to provide a quick and safe hitch for the free end of the chain, the same including a latch release lever which is automatically tripped by novel trip means, whereby to minimize the likelihood of injury to nearby persons from a flying chain-end.

Other objects and advantages of the invention will become more readily apparent from the following description and the accompanying illustrative drawings.

In the drawings:

Figure 2 is a top plan view of the structure seen in elevation in Figure 1;

Figure 3 is a rear-end elevation, that is, a view observing the structure of Figure 1 in a direction from right to left;

Figure 4 is a cross-section on the line 4—4 of Figure 2, looking in the direction of the arrows;

Figure 5 is a perspective view of the safety-type chain-end hitch;

Figure 6 is a perspective view of the automatic hitch releasing and tripping device.

Figure 1:
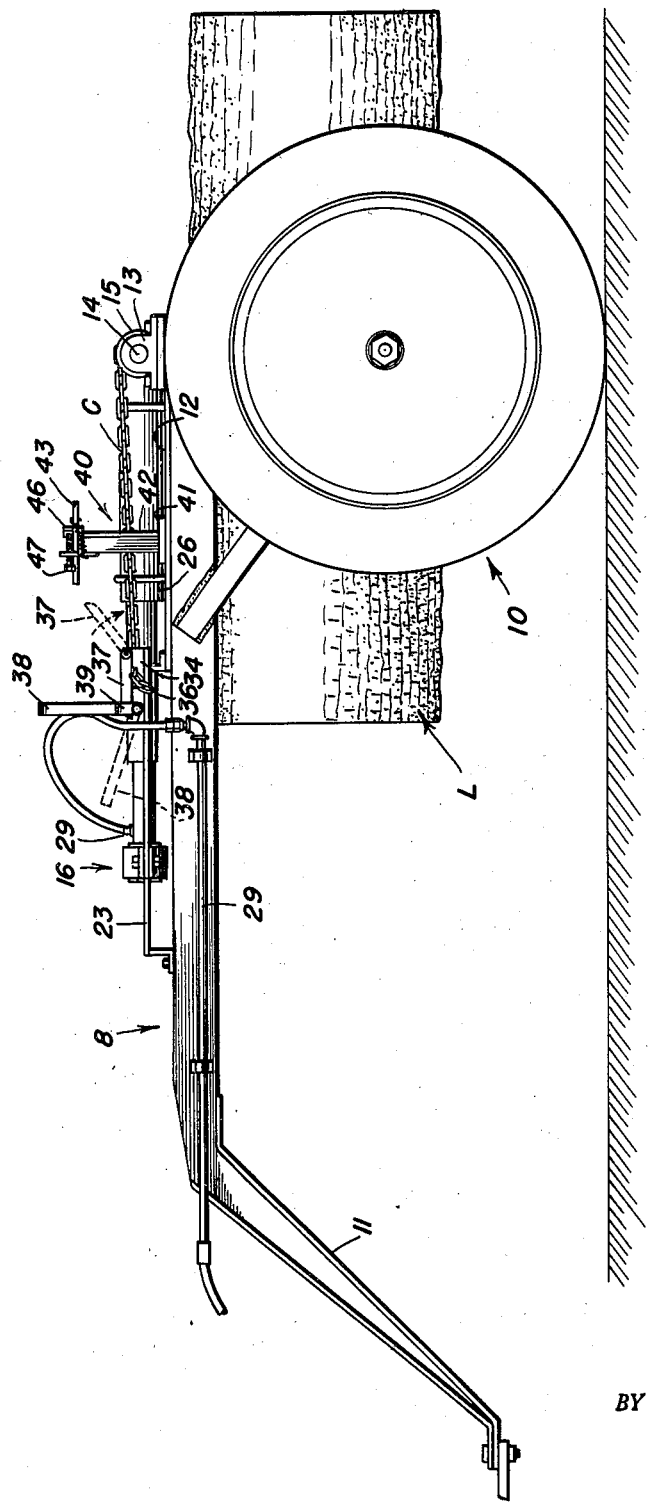
Figure 1 is a side elevational view of a straddle-type log and timber handling cart constructed in accordance with the principles of the present invention.

Referring now to the drawings by distinguishing reference characters it will be seen that the frame of the cart, which is substantially V-shaped in plan view, is denoted by the numeral 8 and that the rear end of same is provided with a suitably constructed arched axle 9 (see Figure 3) on which the rubber tired or equivalent wheels 10 are mounted for operation. The draft tongue, at the forward end, is denoted by the numeral 11 and is also of appropriate construction. A foundation plate 12 is mounted on the rear end portion of the frame and brought out more clearly in Figure 2, this to accommodate the structural improvements herein disclosed. At the rear end of said plate I provide bearings 13 for a shaft 14 which shaft carries chain guiding and adapting pulleys 15. These pulleys, incidentally, are freely shiftable along the shaft and may therefore move toward and from each other to accommodate the spread of the runs of the log embracing chain 16. It follows that the pulleys are self-accommodating depending on the size of the loads and chain action.

The chain is operated by a horizontally disposed reciprocatory actuator which, specifically, is in the nature of a shiftable yoke and said yoke comprises a cross-head 16 and a pair of rearwardly extending arms 17 and 18. Reference being had at this stage of Figure 4, it will be seen that said cross-head is made up of upper and lower bars 19 and 20 connected by assembling bolts 21 and provided at the outer ends with similar bolts 22 providing pivotal connections for the coacting ends of said arms 17 and 18. These bar members 19 and 20 are slidably mounted or relatively stationary tracks 23 forming part of a frame structure whose forward portion 24 is bolted on the frame, the rear ends of the tracks being bolted on the plate 12.

For purposes of shifting the yoke back and forth on the track means a hydraulic lift or jack is employed, the same being denoted, as a general assembly, by the numeral 25 (see Figure 2). The jack includes a cylinder 26 mounted on the plate 12 and plunger means 27 centrally connected as at 28 with the central portion of said cross-head. Incidentally, the hydraulic line or pipe means 29 is connected to the jack in any appropriate manner as shown, for example, in the drawings. The controls for the jack are to be located adjacent the driver's seat on the tractor (not shown).

Referring again to Figure 2 it will be seen that one end portion 30 of the loading and carrying chain is fixedly secured as at 31 to the actuating arm 17. The arm 18 is provided with the aforementioned hitch which is better shown in Figure 5 and denoted by the numeral 32. The hitch comprises a base plate 33 and an upstanding flange 34 having a keeper notch 35 for adjustable anchorage of the links 36 on the free end portion of the chain. The links are simply turned laterally and seated in the keeper notch after which the blade-like latch 37 is swung down to bridge the notch and to launch itself between one of the chain links and the flange 34 in an obvious manner. The latch is retained by a lever 38 having a forked portion 39 pivoted on the flange and engaging the free end portion of the latch in an obvious manner. With the chain links launched in the keeper notch and the latch closed and the lever also closed it is obvious that the free end portion of the chain is securely hitched to the shiftable actuator yoke 16. It is obvious that by throwing the hydraulic lift or jack into and out of play, the actuator yoke is shifted back and forth to either tauten or slacken the chain.

Attention comes now to the so-called automatic trip device disclosed in Figure 6 and denoted by the numeral 40. This comprises a base plate 41 bolted on the foundation plate 12 and carrying an upright 42 with a head plate 43 atop same. A trip arm 44 is pivotally mounted intermediate its ends, as at 45, on the head and provided with a lug 46 serving as a stop for a set screw 47 which is adjustably mounted on the head 43. The upright or standard carries a part 48 to accommodate a coiled return spring 49, one end of the spring being connected to the coacting end portion of the trip arm 44.

The device 40 is set on the plate 12 to dispose the trip arm 44 at the angle seen in Figure 2 and it is obvious therefore that with the free end of the chain fastened in the hitch and with the lever 38 standing vertically, the lever strikes the free end portion of the trip arm 44 and passes by, that is when the actuator yoke is moving in a direction from right to left in Figure 2 for loading the log and tightening the chain. When, however, it is desired to release the chain end 36 it is obvious that when the hydraulic lift is operated to permit the yoke 16 to move in a direction from left to right in Figure 1, the weight of the logs pulls the actuator and chain means rearwardly and as the upstanding lever 38 strikes the trip arm 44, said arm serves to swing the lever open or to the dotted line position shown in Figure 1 whereupon the latch also swings up and releases the chain.

Novelty is predicated upon a cart with a shaft 14 having guide pulleys 15 which are slidably mounted thereon to accommodate the spread of the chain portion. Novelty is further found in the yoke or equivalent device 16 slidably mounted on a track or equivalent device on the cart frame, said yoke having the ends of the chain connected to its arm portions, and especially to one of the arms by way of the novel hitch device of Figure 5. Importance is attached to the use of a hydraulic jack or equivalent lift mounted on a cart and serving to provide a power operated chain actuator. And also, as seen, the trip device of Figure 6 cooperating with the lever 38 of the chain hitch is of outstanding importance.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A log handling cart of the class described comprising a mobile frame provided on its rear end portion with rotatably mounted shaft having chain accommodating and guiding pulleys, tracks fixedly mounted on said frame, a cross-head slidably mounted on said tracks and movable toward and from said shaft, rearwardly extending, arms pivotally connected to the ends of the cross-head, a log chain having portions trained for operation over said pulleys, one end of said chain being rigidly secured to one of said arms, latch means on the remaining arm with which the remaining end of the chain is releasably connected, and a trip device mounted on said frame between one of said pulleys and the last-named arm and in the path of movement of said latch means and including a self-setting trip arm.

2. A log handling cart of the class described comprising a mobile frame provided on its rear end portion with chain accommodating and guiding pulleys, tracks fixedly mounted on said frame, a cross-head slidably mounted on said tracks, arms pivotally connected to the ends of the cross-head and extending rearwardly therefrom, a chain having portions trained for operation over said pulleys, one end of the chain being rigidly secured to one of said arms, and latch means on the remaining arm with which the remaining end of the chain is releasably connected, said latch means comprising an upstanding flange having a keeper notch for the chain links, and a latch pivoted on said flange and swingable across said notch for retentive coaction with the chain links, together with a lever having a fork pivoted on said flange, said fork being arranged to hook over the free end of the latch to retain said latch in closed position and to readily release the latch whenever necessary or desired.

3. A log handling cart of the class described comprising a mobile frame, a shaft mounted on the rear end portion of the frame, pulleys carried by said shaft, spaced parallel fixedly mounted tracks horizontally disposed on said frame, a cross-head slidably mounted on said tracks, chain lifting and lowering arms hingedly mounted on the ends of the cross-head, a log saddling chain, one end portion being trained over one pulley and fixedly connected with one of said arms, the other end portion being trained over the remaining pulley, a hitch for the last-named chain end mounted on the remaining arm and including a notched flange, a pivoted latch on the flange cooperating with the notch and a normally upstanding lever on the flange having a yoke connected with the flange and releasably engageable with the free end of the latch, and a hydraulic jack mounted on said frame and operatively connected with said yoke to move the yoke back and forth on the tracks.

4. A log handling cart of the class described comprising a mobile frame, a shaft mounted on the rear end portion of the frame, pulleys carried by said shaft, spaced parallel fixedly mounted tracks horizontally disposed on said frame, a cross-head slidably mounted on said tracks, chain lifting and lowering arms hingedly mounted on the ends of the cross-head, a log saddling chain, one end portion being trained over one pulley and fixedly connected with one of said arms, the other end portion being trained over the remaining pulley, a hitch for the last-named chain end mounted on the remaining arm and including a notched flange, a pivoted latch on the flange cooperating with the notch and a normally upstanding lever on the flange having a yoke connected with the flange and releasably engageable with the free end of the latch, a hydraulic jack mounted on said frame and operatively connected with said yoke to move the yoke back and forth on the tracks, and a trip device mounted on said frame in the path of movement of said lever.

5. A log handling cart of the class described comprising a mobile frame, a shaft mounted on the rear end portion of the frame, pulleys carried by said shaft, spaced parallel fixedly mounted tracks horizontally disposed on said frame, a cross-head slidably mounted on said tracks, chain lifting and lowering arms hingedly mounted on the ends of the cross-head, a log saddling chain, one end portion being trained over one pulley and fixedly connected with one of said arms, the other end portion being trained over the remaining pulley, a hitch for the last-named chain end mounted on the remaining arm and including a notched flange, a pivoted latch on the flange cooperating with the notch and a normally upstanding lever on the flange having a yoke connected with the flange and releasably engageable with the free end of the latch, a hydraulic jack mounted on said frame and operatively connected with said yoke to move the yoke back and forth on the tracks, and a trip device mounted on said frame in the path of movement of said lever, said trip device including a pivotally mounted spring returned trip arm.

6. As a new article of manufacture and as a component part of a log handling cart, a chain hitch comprising a base member with a flange, said flange having a keeper notch for a chain link, a latch blade pivoted on said flange and swingable across said notch, a lever, said lever having a yoke straddling and pivotally mounted on one end of the flange and cooperable with the adjacent end portion of the latch.

7. As a new article of manufacture and as a component part of a structure of the class described, a trip device comprising a base, a standard rising from the base, a head on the upper end of the standard, a trip arm horizontally and pivotally mounted between its ends on said head, a stop screw on said head engageable with the arm, and a spring connection between the standard and one end of the arm.

8. A log handling cart of the class described comprising a mobile frame provided on its rear end portion with rotatably mounted shaft having chain accommodating and guiding pulleys, tracks fixedly mounted on said frame, a cross-head slidably mounted on said tracks and movable toward and from said shaft, rearwardly extending arms pivotally connected to the ends of the cross-head, a log chain having portions trained for operation over said pulleys, one end of said chain being rigidly secured to one of said arms, latch means on the remaining arm with which the remaining end of the chain is releasably connected, and a trip device mounted on said frame between one of said pulleys and the last-named arm and in the path of travel of said latch means and including a horizontally disposed, pivotally mounted trip arm which serves to engage and trip said latch means when latter moves in a direction rearwardly and toward said shaft and also serving to allow said latch means to travel freely in a forward direction without being effected by said trip arm.

9. A log handling cart of the class shown and described comprising a mobile frame provided with rotatably mounted chain accommodating and guiding pulleys, a cross-head slidably mounted on said frame in a direction forwardly of said pulleys, latch means mounted on and carried by said cross-head, said latch means embodying a pivotally mounted chain engaging and retaining latch and a pivotally mounted lever normally engaging and holding said latch in chain-retention position, said latch means being movable rearwardly and forwardly in respect to said pulleys and said lever being normally in an upstanding position ready for release as it travels rearwardly in a direction toward said pulleys, a horizontally disposed, pivotally mounted spring returned trip arm also mounted on said frame and projecting into the path of movement of said upstanding lever, whereby when said lever comes into engagement with said arm, the lever is tripped and the latch is released to allow the chain to become disengaged.

THOMAS A. DOWD.

REFERENCES CITED

The following references are of record in the file of this patent:

UNITED STATES PATENTS

| Number | Name | Date |
|---|---|---|
| 2,361,181 | Dowd | Oct. 24, 1944 |
| 2,433,822 | Bartholomew | Dec. 30, 1947 |
| 2,433,972 | Alexander | June 22, 1948 |
| 2,452,338 | Thompson | Oct. 26, 1948 |